US008720776B2

(12) United States Patent
Greene

(10) Patent No.: US 8,720,776 B2
(45) Date of Patent: May 13, 2014

(54) X-RAY SECURITY SYSTEM

(76) Inventor: Paul Llewellyn Greene, Leesburg, VA (US)

( * ) Notice: Subject to any disclaimer, the term of this patent is extended or adjusted under 35 U.S.C. 154(b) by 210 days.

(21) Appl. No.: 13/293,316

(22) Filed: Nov. 10, 2011

(65) Prior Publication Data

US 2013/0119127 A1 May 16, 2013

(51) Int. Cl.
*G06K 5/00* (2006.01)
(52) U.S. Cl.
USPC ........... 235/380; 235/439; 235/475; 340/5.52
(58) Field of Classification Search
USPC ........................ 235/380, 439, 475; 340/5.52
See application file for complete search history.

(56) References Cited

U.S. PATENT DOCUMENTS

| | | | | |
|---|---|---|---|---|
| 2,539,609 | A | * | 1/1951 | Buckingham .................... 156/62 |
| 2001/0025115 | A1 | * | 9/2001 | Campbell et al. ................. 556/7 |
| 2006/0010086 | A1 | * | 1/2006 | Klein ............................. 705/410 |
| 2007/0257797 | A1 | * | 11/2007 | Rancien et al. ............. 340/572.1 |
| 2008/0235055 | A1 | * | 9/2008 | Mattingly et al. ................. 705/3 |
| 2009/0008924 | A1 | | 1/2009 | Ophey et al. |
| 2009/0121473 | A1 | | 5/2009 | Camus et al. |
| 2009/0294534 | A1 | * | 12/2009 | Pepori et al. ................... 235/439 |
| 2009/0315320 | A1 | * | 12/2009 | Finn .............................. 283/107 |
| 2011/0086231 | A1 | * | 4/2011 | Lochtman et al. .......... 428/423.1 |
| 2012/0200389 | A1 | * | 8/2012 | Solomon ....................... 340/5.52 |
| 2013/0121463 | A1 | * | 5/2013 | Nesch et al. .................... 378/62 |
| 2013/0225991 | A1 | * | 8/2013 | Powers .......................... 600/433 |
| 2013/0338494 | A1 | * | 12/2013 | Wiley et al. ................... 600/424 |

\* cited by examiner

*Primary Examiner* — Allyson Trail
(74) *Attorney, Agent, or Firm* — Da Vinci's Notebook, LLC

(57) ABSTRACT

The present invention is directed to security systems that utilize electromagnetic radiation. The security system includes an authentication security document, an authentication system, and a process for authenticating security documents. The security document includes a document body with an RFID and body information pertinent to the security document. The RFID inlay includes a radiopaque material or other material that is opaque to ranges of electromagnetic radiation. The authentication system for secured documents includes an electromagnetic scanning device, a document with a document body, and the RFID device. The scanning device includes a secured device inlet suitable to accept the document body and a display that shows the results of the electromagnetic bombardment of the document body. The process for authenticating security documents includes positioning within the scanning device the security document to create a radiated image thereof that displays the inlay information.

6 Claims, 4 Drawing Sheets

US 8,720,776 B2

X-RAY SECURITY SYSTEM

FIELD OF THE INVENTION

The present invention relates to the field of security and more specifically to the field of electromagnetic radiation security systems.

BACKGROUND

Modern technology has made it easy for most people to quickly and inexpensively make accurate copies of documents. Counterfeiting of security documents is an increasing problem. Software and high quality photographic and printing technology are making it easier for criminals to produce and pass counterfeit documents.

The main reason that counterfeiting remains a major concern is the ease and speed with which large quantities of counterfeit documents can be produced using publishing software combined with high quality photographic and printing equipment. The occurrence of counterfeiting is likely to increase because these technologies are more readily available, and the techniques are more easily understood by an increasingly larger segment of the criminal population.

While these technologies may not reproduce the watermarks, color shifting, embedded security threads, microprinting, and the general feel of documents, in high-volume security examinations these features are often overlooked so that counterfeit documents are often accepted as genuine. Most of the countries around the world are therefore now committed to introducing new technologies, as well as additional regulations and processes to make identification of counterfeit documents easier, to thereby reduce the incidence of accepting counterfeit documents.

There is a need for devices that accurately, quickly, easily and affordably distinguish the difference between authentic and counterfeit documents.

SUMMARY

The present invention is directed to an X-ray security system. The X-ray security system includes an authentication security document, an authentication system, and a process for authenticating security documents. The security document includes a document body with an RFID and body information pertinent to the security document. For example, body information for a driver's license may include the driver's license number, birthdate, name, etc. The RFID includes an inlay with radiopaque inlay information relating to the body information. The radiopaque nature of the inlay is designed to block the path of x-rays. The RFID includes RFID storage that retains identification information related to the body information that may be transmitted through an RFID antenna.

The authentication system for secured documents includes an electromagnetic scanning device, a document with a document body, and the RFID device. The scanning device produces electromagnetic radiation at a predetermined scanning device frequency range, preferably that of x-rays. The scanning device includes a secured device inlet suitable to accept the document body and a display that shows the results of the electromagnetic bombardment of the document body.

The process for authenticating security documents includes positioning within the scanning device the security document. The security document is bombarded with X-ray radiation to produce an adjusted image. The adjusted image is then displayed on the scanning device such that the inlay information is discernable. Identification information is received from the RFID of the security document.

Therefore, it is an aspect of the present invention to permit the authentication of security documents.

It is a further aspect of the present invention to permit evaluation of security documents with existing, common machinery.

It is a further aspect of the present invention to allow multiple avenues of authentication of security documents.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figure 1:
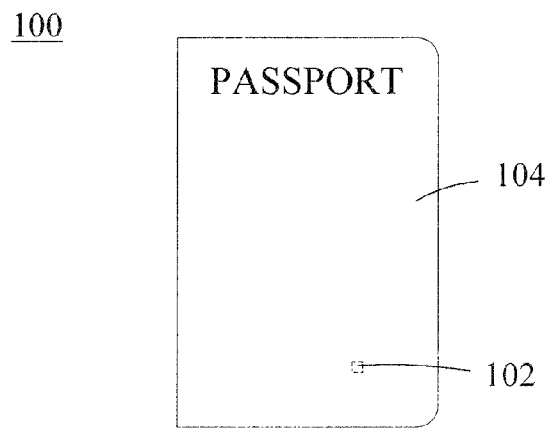
FIG. 1 is a plan view of an embodiment of a security document of the present invention.
Figure 2:
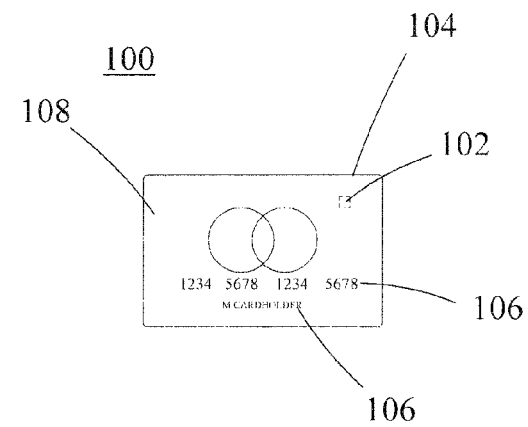
FIG. 2 is a plan view of an embodiment of a security document of the present invention.

Referring first to FIGS. 1 and 2, a basic embodiment of a security document 100 is shown. The security document 100 includes a document body 104 with an RFID device 102 and body information 106 pertinent to the security document 100. The security document includes any document that purports to relate to or from a source and includes information about that source on an information surface 108. Examples of security documents include electronic health cards/ids, military electronic identification, WHTI electronic ids, electronic passports, RFID enabled credit cards, contact smart card enabled credit cards, or chip identifiers. Examples of body information may include passport numbers, identity document numbers, tax identification numbers, social security numbers, credit card numbers, dates of birth, any data contained in the electronic passport that is part of the ICAO 9303 standard, motor vehicle licensing information, and the like.

Figure 3:
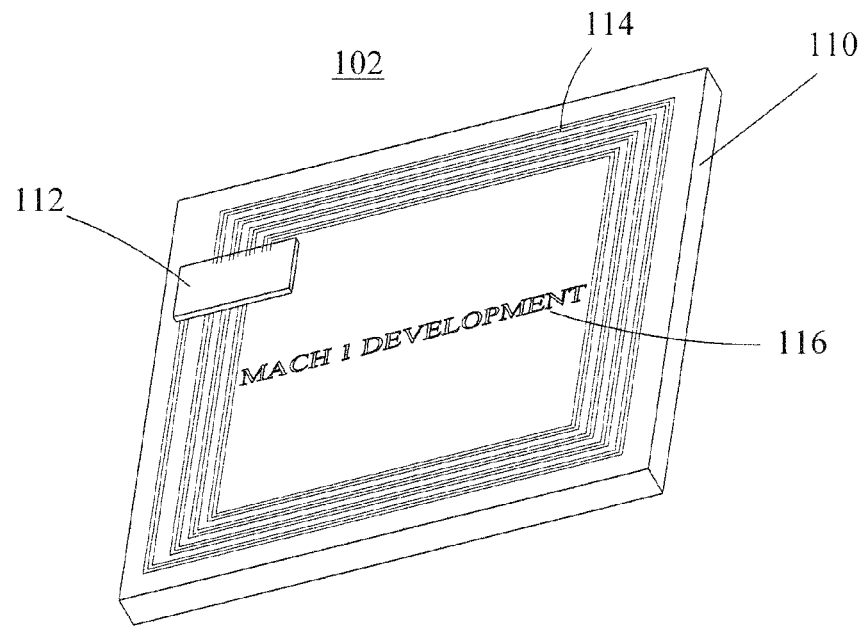
FIG. 3 is a perspective view an embodiment of an RFID of the present invention.

Turning now to FIG. 3, the RFID device 102 includes an inlay 110 with radiopaque inlay information 116. By radiopaque, it is meant any material suitable to block the path of a substantial amount of x-ray radiation to permit the viewing of that material in quantity minute enough to permit effective scribing of information in alphanumeric characters. Although lead is a preferred radiopaque material, other suitable materials may include lead-polymer composites, solid lead encased within a matrix such as a polymer matrix, or as a filler. The filler may include lead particles, tribasic lead-sulfate or lead-oxide particles or particles of a specified shape or size, or as a mixture with other materials such as tin. Tungsten shielding, or polymer-tungsten may also be used.

Other suitable candidates may be determined from a search of existing materials suitable for thin-dimension x-ray shielding. Examples of suitable materials for the inlay substrate include, but are not limited to, high Tg polycarbonate, polyethylene terephthalate (PET), polyarylate, polysulfone, a norbornene copolymer, poly phenylsulfone, polyetherimide, polyethylenenaphthalate (PEN), polyethersulfone (PES), polycarbonate (PC), a phenolic resin, polyester, polyimide, polyetherester, polyetheramide, cellulose acetate, aliphatic polyurethanes, polyacrylonitrile, polytrifluoroethylenes, polyvinylidene fluorides, HDPEs, poly(methyl methacrylates), a cyclic or acyclic polyolefin, or paper. Both the inlay 110 and the security document 102 permit the transmission of x-ray radiation therethrough, and an examination of the security document during x-ray bombardment will reveal only the inlay information 116. The identification information is related to the body information in that it may be a reproduction of the body information, supplement the body information, provide an access code to a secondary database that permits authentication of the body information, and the like.

The inlay information 116 is preferably related to the body information 106. The inlay information is related to the body information in that it may be a reproduction of the body information, supplement the body information, provide an access code to a secondary database that permits authentication of the body information, and the like. The relationship between body information and inlay information may provide any direct or indirect means of authenticating the security document or the user of the security document.

The RFID preferably includes storage in the form of a processor 112 that retains identification information related to the body information. The identification information is related to the body information in that it may be a reproduction of the body information, supplement the body information, provide an access code to a secondary database that permits authentication of the body information, and the like. The relationship between body information and identification information may provide any direct or indirect means of authenticating the security document or the user of the security document. The RFID device further includes an antenna 114 for transmission of the identification information. The antenna may be formed from conductive ink that is printed or otherwise deposited on the inlay. Alternatively, the antenna may be formed from metal deposited on the inlay by any of a variety of suitable, known deposition methods, such as vapor deposition. As a further alternative, the antenna may be part of a web of antenna material that is adhered to the substrate by suitable means, for example, by use of a suitable adhesive in a lamination process. The web antennae may be made from, for example, copper, silver, aluminum or other thin conductive material (such as etched or hot-stamped metal foil, conductive ink, sputtered metal, etc.). The web of antennae may be on a film, coated paper, laminations of film and paper, or other suitable substrate. As yet another alternative, the antenna 114 may be formed by selective removal of metal from a metal layer, for example, using known lithography processes. It will be appreciated that other suitable means, for example, electroplating, may be used to form the antenna 106 on the inlay substrate.

Figure 4:
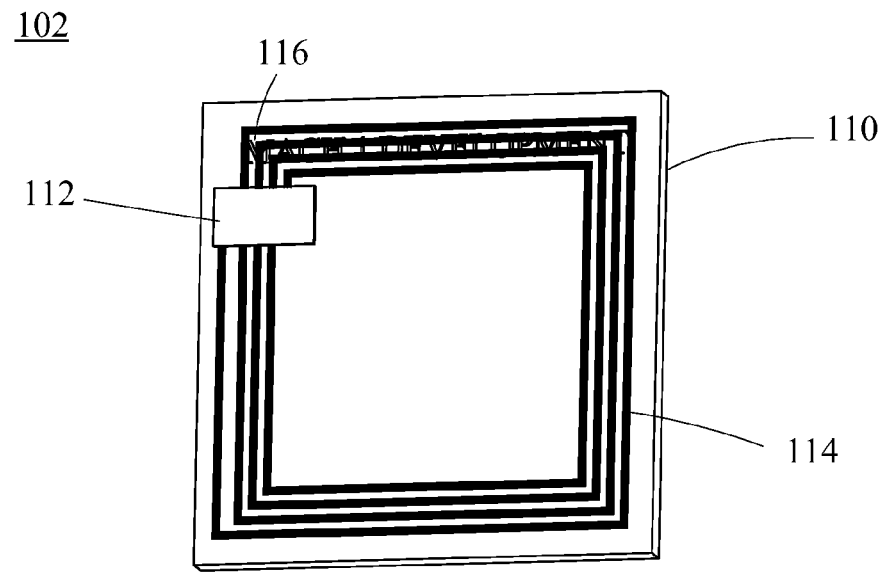
FIG. 4 is a perspective view of an embodiment of an RFID of the present invention.

The inlay information 116 is preferably related to the identification information. The inlay information is related to the identification information in that it may be a reproduction of the body information, supplement the body information, provide an access code to a secondary database that permits authentication of the body information, and the like. The relationship between identification information and inlay information may provide any direct or indirect means of authenticating the security document or the user of the security document. As FIG. 4 shows, the antenna 114 or other component the RFID device may obscure at least a portion of the inlay information 116. Furthermore, the inlay information may be entirely obscured by the presence of an additional layer of material, i.e. buried information.

Figure 5:
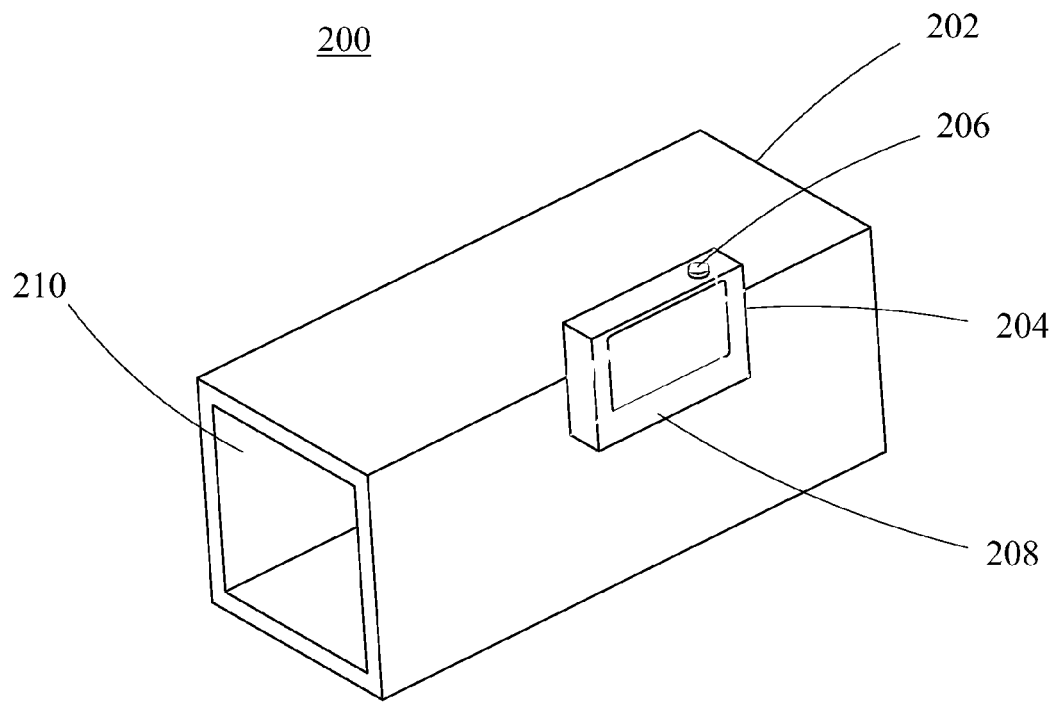
FIG. 5 is a perspective view of an embodiment of the system of the present invention.

Turning now to FIG. 5, the authentication system 200 for secured includes an electromagnetic scanning device 202, and a security document (not shown) with a document body bearing the RFID device. The scanning device 202 produces electromagnetic radiation at a predetermined scanning device frequency range, preferably that of x-rays. X-rays have a wavelength in the range of 10.0 to 0.01 nanometers, corresponding to frequencies in the range 30 petahertz to 30 exahertz ($3\times10^{16}$ Hz to $3\times10^{19}$ Hz) and energies in the range 120 eV to 120 keV.

The scanning device includes a secured device inlet 210 suitable to accept the document body and a display 204 with a screen 208 that shows the results of the electromagnetic bombardment of the document body. A preferred scanning device includes a standard X-ray scanner, as is typically found airports and other travel hubs. The preferred scanning device further includes a receiver 206 to accept transmissions from the RFID antenna of the security document. Alternatively, the present invention may utilize a receiver 206 located on an ancillary device, e.g. a handheld receiver, not directly connected to the scanning device.

Figure 6:
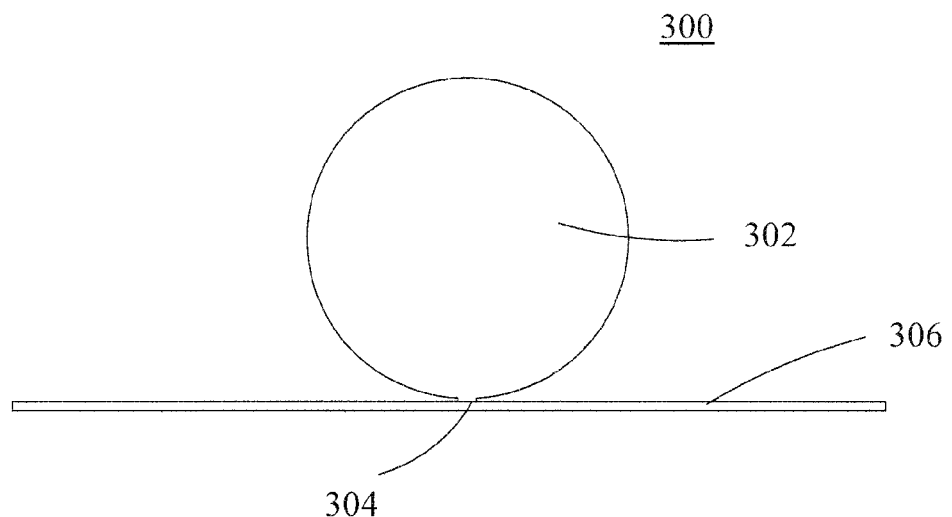
FIG. 6 is a view of the process of manufacturing RFID of the present invention.
Figure 7:
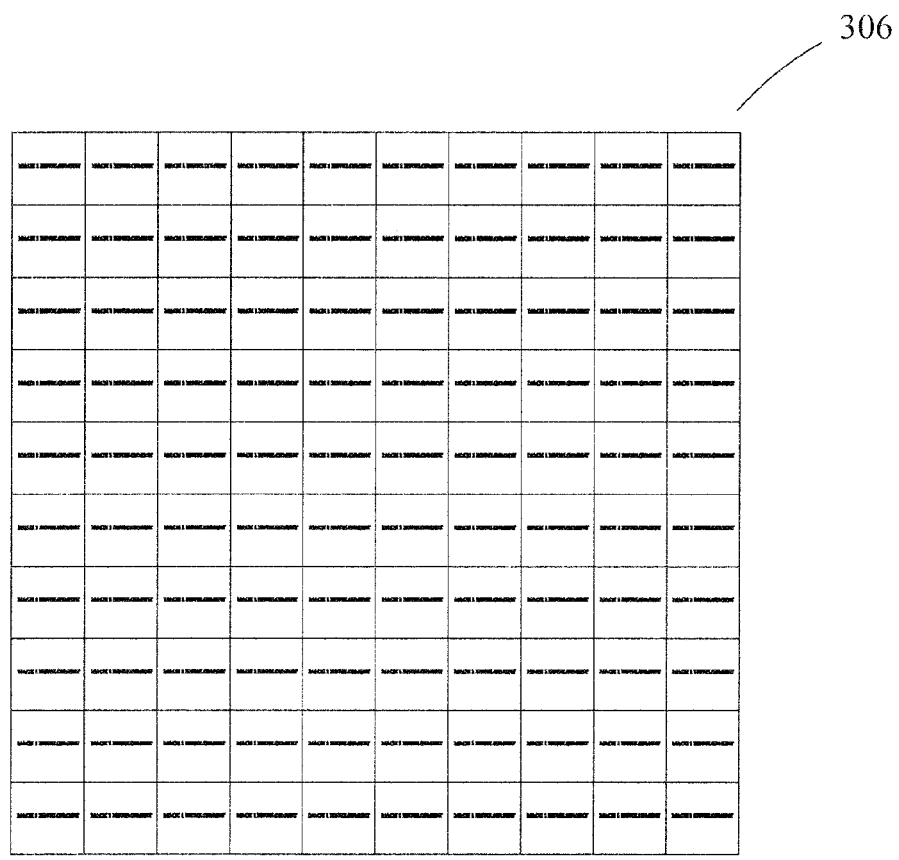
FIG. 7 is a plan view of an assembly sheet of RFID of the present invention.

Turning now to FIG. 6, the RFID of the present invention may be fabricated in the normal fashion of RFID interposer layers with the addition of an inlay information application unit 302. The inlay application unit 302 may utilize any known means of applying type to a material, including printing or silk-screening to the inlay or inlay substrate before, during or after the metallization process. The inlay application unit 302 preferably applies inlay information through a dispenser 304 to a moving sheet 306 of inlay, which may then be cut into individual RFID as is shown by FIG. 7.

Figure 8:
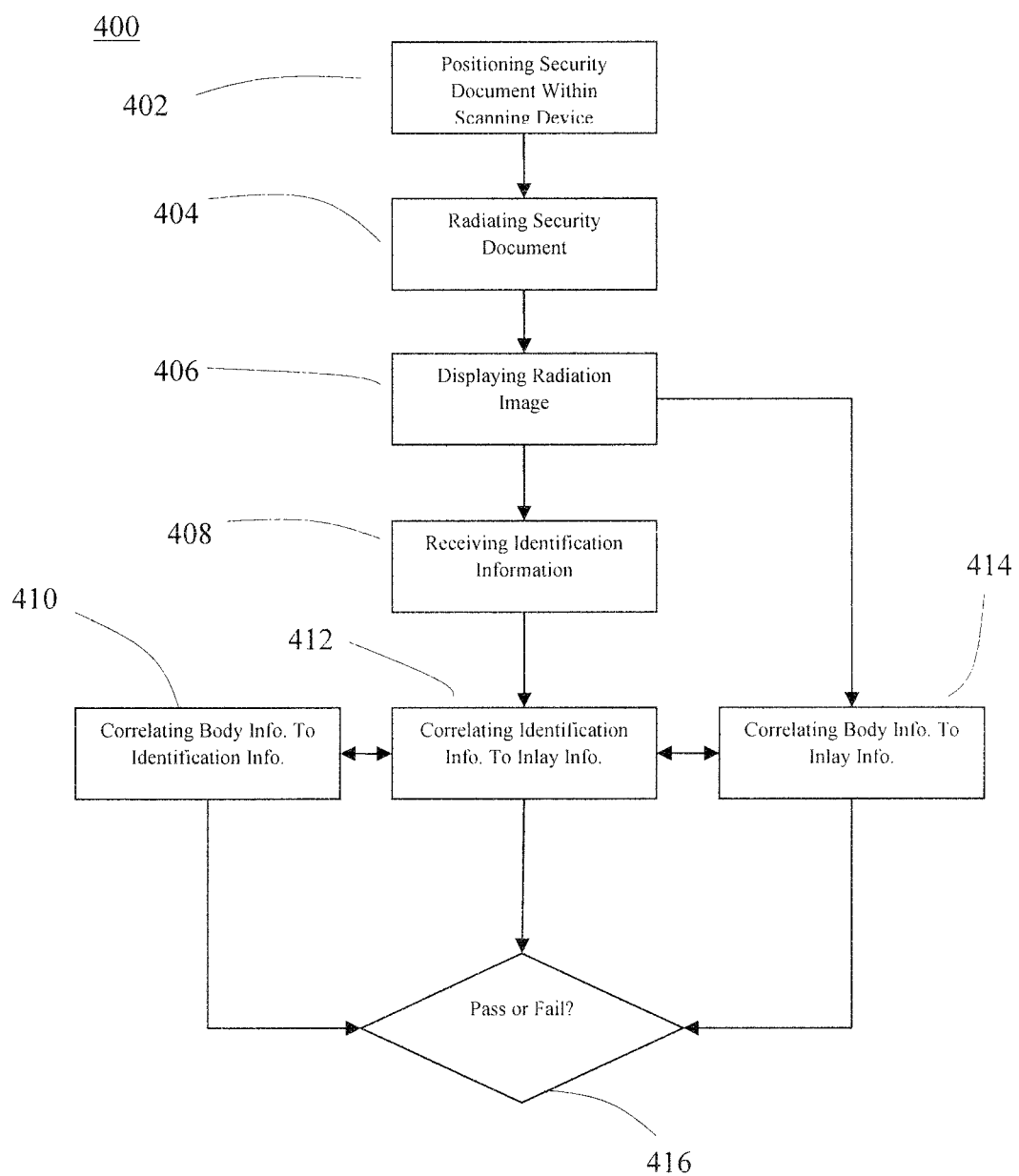
FIG. 8 is a view of an embodiment of a process for authenticating security documents of the present invention.

Turning now to FIG. 8, the process 400 for authenticating security documents includes positioning 402 within the scanning device the security document. The security document is bombarded 404 with X-ray radiation to produce an image adjusted by the radiation of the scanning device. The adjusted image is then displayed 406 on the scanning device such that the inlay information is discernable to a user of the machine. Identification information is received 408 from the RFID of the security document. From the radiating step 404 and the identification step, together with a simple visual review of the security document a security advisor has three sets of secured information to relate one to the other. The user may correlate the body information to the identification information, correlate 414 the body information to the inlay information, or correlate 412 the inlay information to the identification information 410. The authenticity of the security document may be judged 416 therewith.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A process for authenticating security documents, said process comprising:

positioning within a scanning device a document with a document body having an information surface bearing visible alphanumeric body information, wherein said document body includes an RFID device with an inlay bearing radiopaque alphanumeric inlay information relating to said body information and an antenna adapted to transmit identification information related to said body information;

radiating with said scanning device X-ray radiation toward said document body to produce an adjusted image;

displaying said adjusted image on said scanning device such that said inlay information is discernable; and receiving said identification information.

2. The process of claim 1 further comprising matching said identification information to said body information.

3. The process of claim 1 further comprising matching said identification information to said inlay information.

4. The process of claim 1 further comprising matching said body information to said inlay information.

5. The process of claim 1 further comprising verifying said body information through at least one of said identification information and said inlay information.

6. The process of claim wherein 1 said positioning step include positioning within a scanning device a passport.

* * * * *